United States Patent
Dudar

(10) Patent No.: US 10,100,771 B2
(45) Date of Patent: Oct. 16, 2018

(54) METHOD AND SYSTEM FOR SENSOR RATIONALITY CHECK

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 203 days.

(21) Appl. No.: 15/215,415

(22) Filed: Jul. 20, 2016

(65) Prior Publication Data

US 2018/0023497 A1    Jan. 25, 2018

(51) Int. Cl.
  *F02D 41/22* (2006.01)
  *F02M 37/00* (2006.01)
  *F02M 25/08* (2006.01)

(52) U.S. Cl.
  CPC .......... *F02D 41/222* (2013.01); *F02D 41/22* (2013.01); *F02M 25/0809* (2013.01); *F02M 25/0836* (2013.01); *F02M 25/0854* (2013.01); *F02M 37/0076* (2013.01)

(58) Field of Classification Search
  CPC .............. F02M 25/08; F02M 25/0809; F02M 25/0836; F02M 25/0872; F02M 25/089; F02M 2025/0845; F02D 41/222; G01L 24/007; B60W 2050/0215
  USPC ...... 123/518–521, 298; 701/29.7, 29.8, 30.3, 701/30.5, 30.9
  See application file for complete search history.

(56) References Cited

U.S. PATENT DOCUMENTS

| | | | |
|---|---|---|---|
| 5,183,023 A | 2/1993 | Hanson | |
| 5,898,107 A | 4/1999 | Schenk | |
| 6,293,261 B1* | 9/2001 | Oemcke | F02M 25/0854 123/516 |
| 7,146,970 B2* | 12/2006 | Everingham | F02M 25/0836 123/520 |
| 9,624,853 B2* | 4/2017 | Dudar | F02D 41/004 |
| 9,709,007 B2* | 7/2017 | Dudar | F02M 25/0854 |
| 2010/0059022 A1* | 3/2010 | Bierl | F02D 41/0032 123/478 |
| 2014/0144416 A1* | 5/2014 | Heinrich | F02D 41/0042 123/672 |
| 2015/0121999 A1* | 5/2015 | Dudar | F02D 41/221 73/114.39 |
| 2015/0354478 A1 | 12/2015 | Dudar | |
| 2017/0058800 A1* | 3/2017 | Dudar | F02D 41/0045 |

* cited by examiner

*Primary Examiner* — Lindsay Low
*Assistant Examiner* — Robert Werner
(74) *Attorney, Agent, or Firm* — Julia Voutyras; McCoy Russell LLP

(57) ABSTRACT

Methods and systems are provided for performing rationality check of a hydrocarbon sensor in an evaporative emission control system. In one example, a method may include sensing fuel vapors vented from a fuel vapor canister to atmosphere via the sensor, and performing sensor rationality check by flowing desorbed hydrocarbons from the fuel vapor canister to an engine via the sensor during purging of the fuel vapor canister.

20 Claims, 6 Drawing Sheets

METHOD AND SYSTEM FOR SENSOR RATIONALITY CHECK

FIELD

The present description relates generally to methods and systems for detecting degradation of a sensor for monitoring hydrocarbon breakthrough from a fuel vapor canister.

BACKGROUND/SUMMARY

Hybrid vehicle fuel systems may include a sealed fuel tank configured to withstand high fuel tank pressure and vacuum levels. The vehicle may include a fuel tank isolation valve to seal the fuel tank from the atmosphere. Pressure in the fuel tank may build up due to the generation of fuel vapors. If the pressure inside the fuel tank reaches the capacity of the fuel tank, fuel vapors may be released from the fuel tank into a fuel vapor canister by opening the fuel tank isolation valve. Hydrocarbons (HCs) in the fuel vapors may be adsorbed and stored in the fuel vapor canister, and the rest of the fuel vapors may be vented to atmosphere. At a later time, such as when the engine is in operation, stored HCs in the fuel vapor canister may be purged into an engine intake manifold and combusted as fuel. However, due to non-uniform purge flow within the canister, the fuel vapor canister may not be completely purged. Consequently, retained HCs may breakthrough from the fuel vapor canister and vent to the atmosphere as a bleed emission. A hybrid vehicle may in particular suffer from bleed emissions due to limited engine runtime. Further, bleed emission may be significant for a vehicle that has been parked in high ambient temperature for a long duration.

Other attempts to address bleed emissions including arranging a fuel vapor sensor at the fresh air port of the fuel vapor canister. One example approach is shown by Oemcke et al. in U.S. Pat. No. 6,293,261 B1. Therein, fuel vapor content exiting the fuel vapor canister is monitored in real time by the fuel vapor sensor.

However, the inventors herein have recognized potential issues with such systems. As one example, the fuel vapor sensor needs to be rationalized in the presence of HCs. However, since the fuel vapor sensor is positioned at the fresh air port of the fuel vapor canister, the fuel vapor sensor may only detect HCs when there is HC breakthrough from the canister to the atmosphere. When the fuel vapor canister functions effectively and is thoroughly purged, fuel vapors flowing through the fuel vapor sensor may contain little or no HCs. Due to the sensor's limited exposure to HCs, degradation of the fuel vapor sensor may be left undetected. Consequently, bleed emissions at a later time may not be effectively monitored and controlled.

In one example, the issues described above may be addressed by a method for detecting sensor degradation during fuel vapor canister purge, comprising: sensing fuel vapor vented from a fuel vapor canister to atmosphere via a sensor; and during purging of the fuel vapor canister, actuating valves to flow desorbed hydrocarbons from the fuel vapor canister to the engine, sensing desorbed hydrocarbons with the sensor positioned in the flow path of the desorbed hydrocarbons, and determining sensor degradation based on the sensed desorbed hydrocarbons. In this way, degradation of the sensor may be regularly checked during engine runtime.

As one example, a method for an engine comprises, loading a fuel vapor canister by flowing fuel vapors from a fuel tank to a load port of the canister, and monitoring HC content in fuel vapors vented from a vent port of the canister to atmosphere by a HC sensor. During fuel vapor canister purging, the method flows fresh air first from a purge port to the vent port of the canister, and then flows desorbed HCs to a manifold of the engine via the HC sensor. As the desorbed HCs flowing through the HC sensor, the HC sensor rationality check is performed. After finishing the rationality check, the method flows fresh air from the vent port to the purge port to continue purging the fuel vapor canister. As such, a two-stage fuel vapor canister purging procedure is realized. At the first stage, air flows in a first direction inside the fuel vapor canister during HC sensor rationality check. At the second stage, air flows inside the fuel vapor canister in a second, reversed direction relative to the first direction. The two-stage fuel vapor canister purging ensures that the HC sensor rationality check may be performed frequently in the presence of high concentration of HCs. Further, by purging the fuel vapor canister at two opposite air flow directions, HCs stored in the canister may be thoroughly purged.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
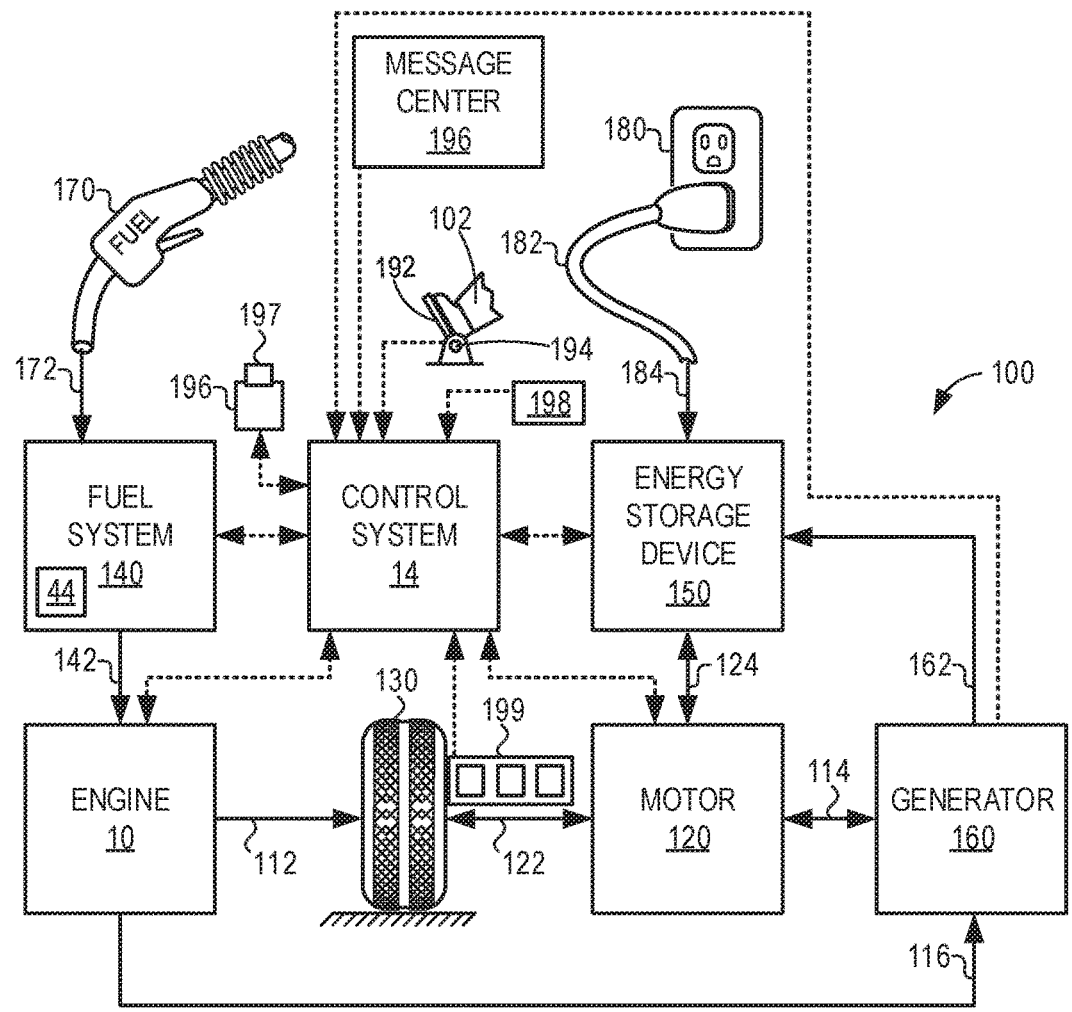
FIG. 1 schematically shows an example vehicle propulsion system.
Figure 2:
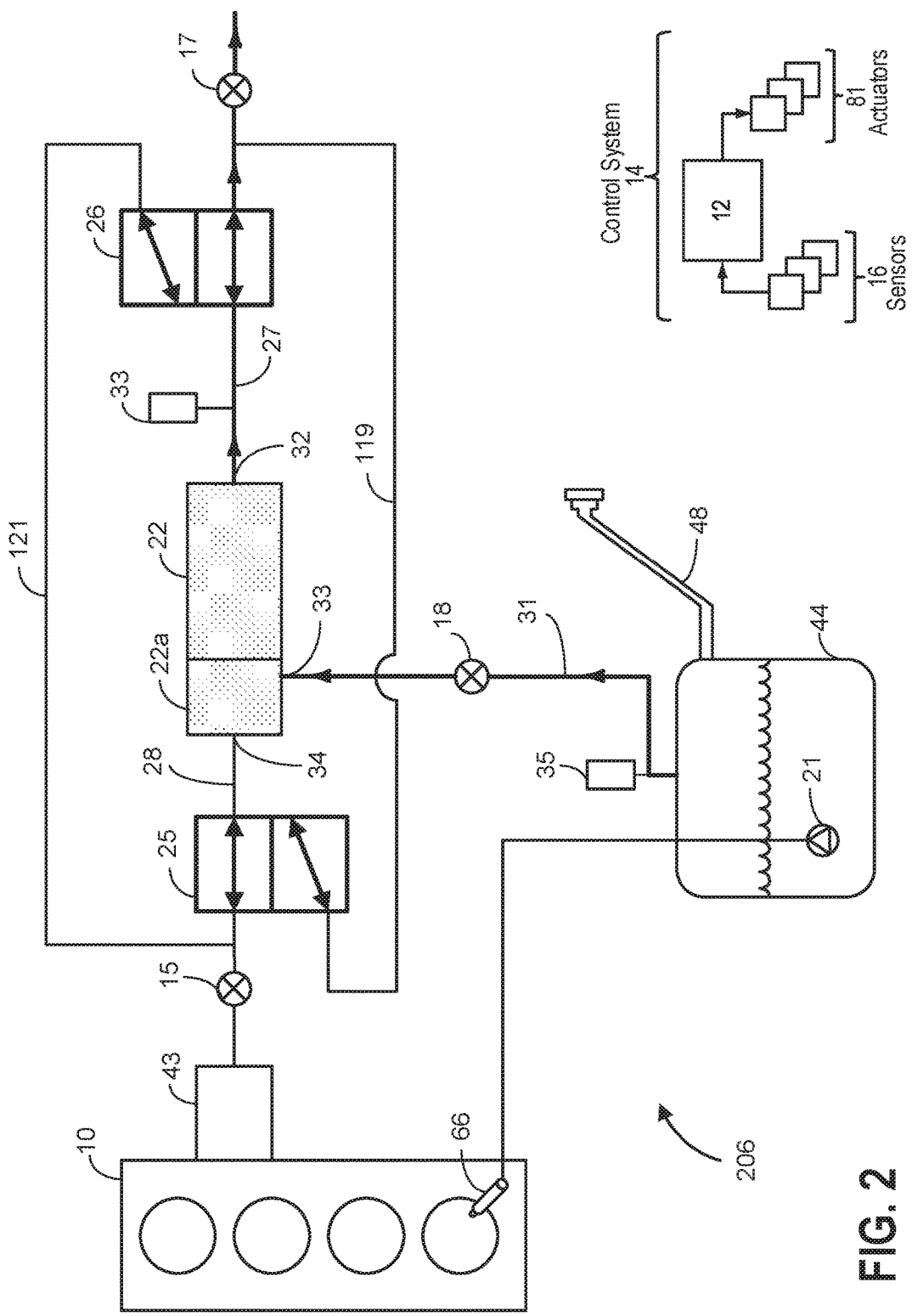
FIG. 2 illustrates an example engine coupled with a fuel system and an evaporative emission control system.
Figure 3:
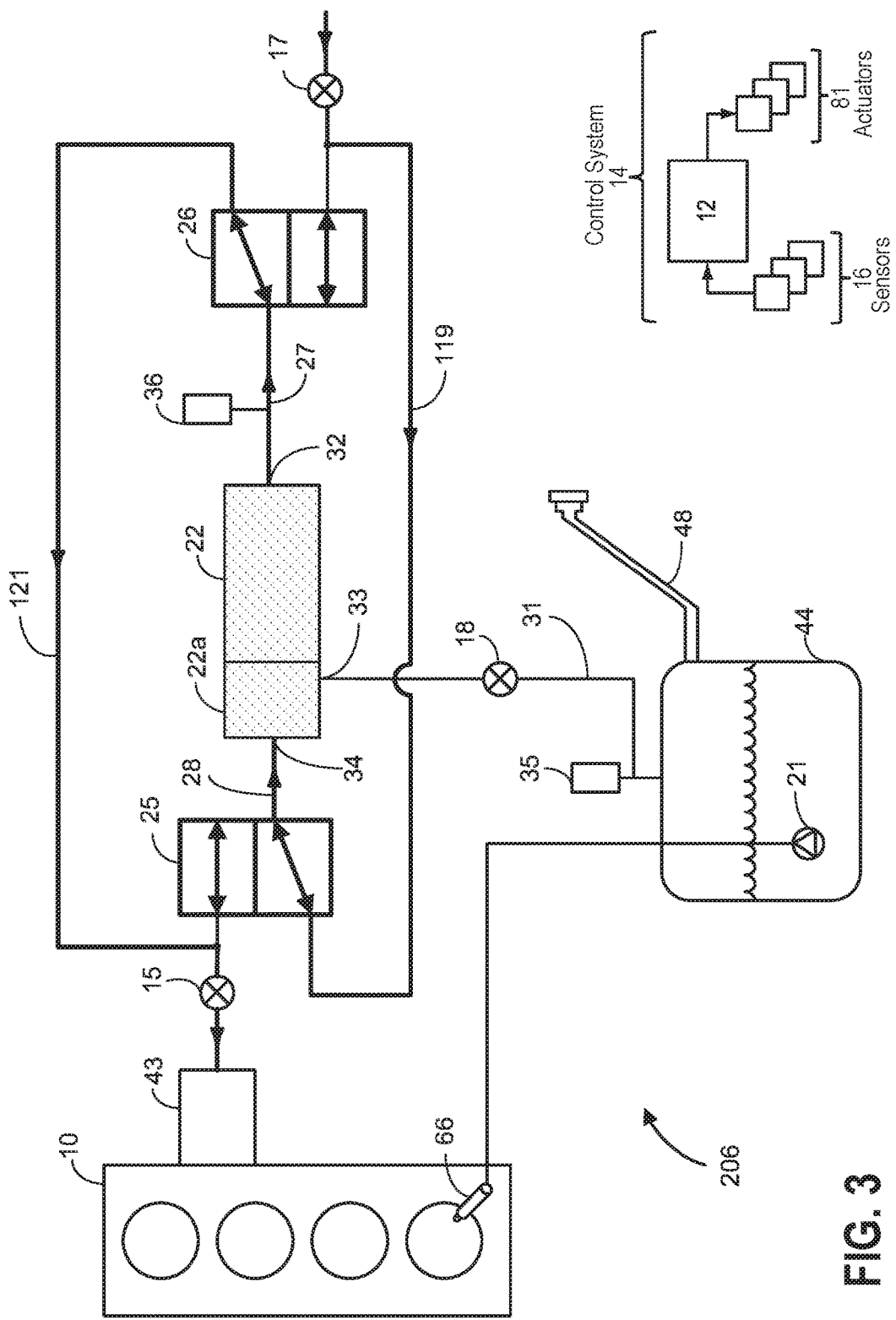
FIG. 3 shows an example system configuration for purging the fuel vapor canister.
Figure 5:
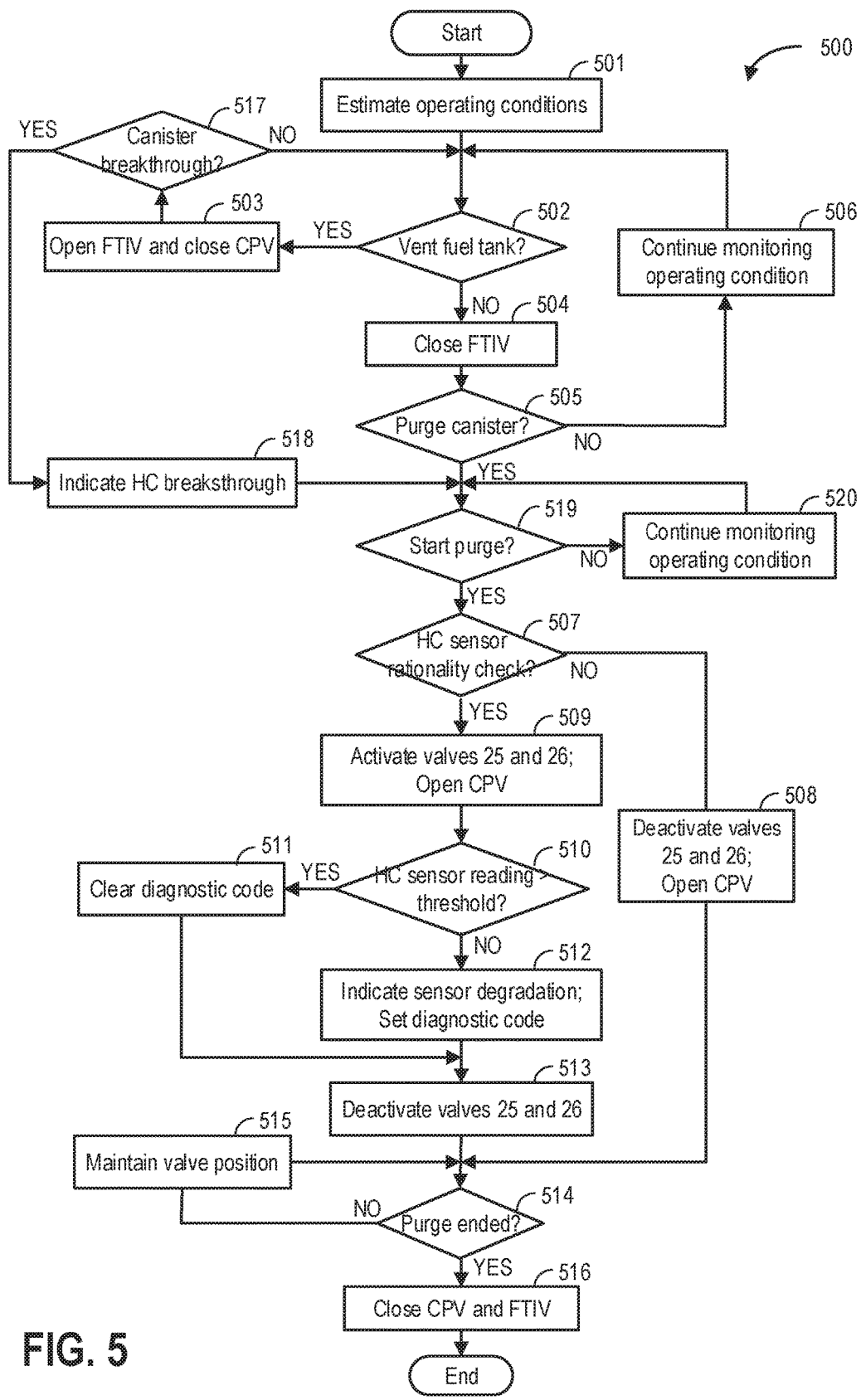
FIG. 5 is a flow diagram demonstrating an example method of performing sensor rationality check.
Figure 6:
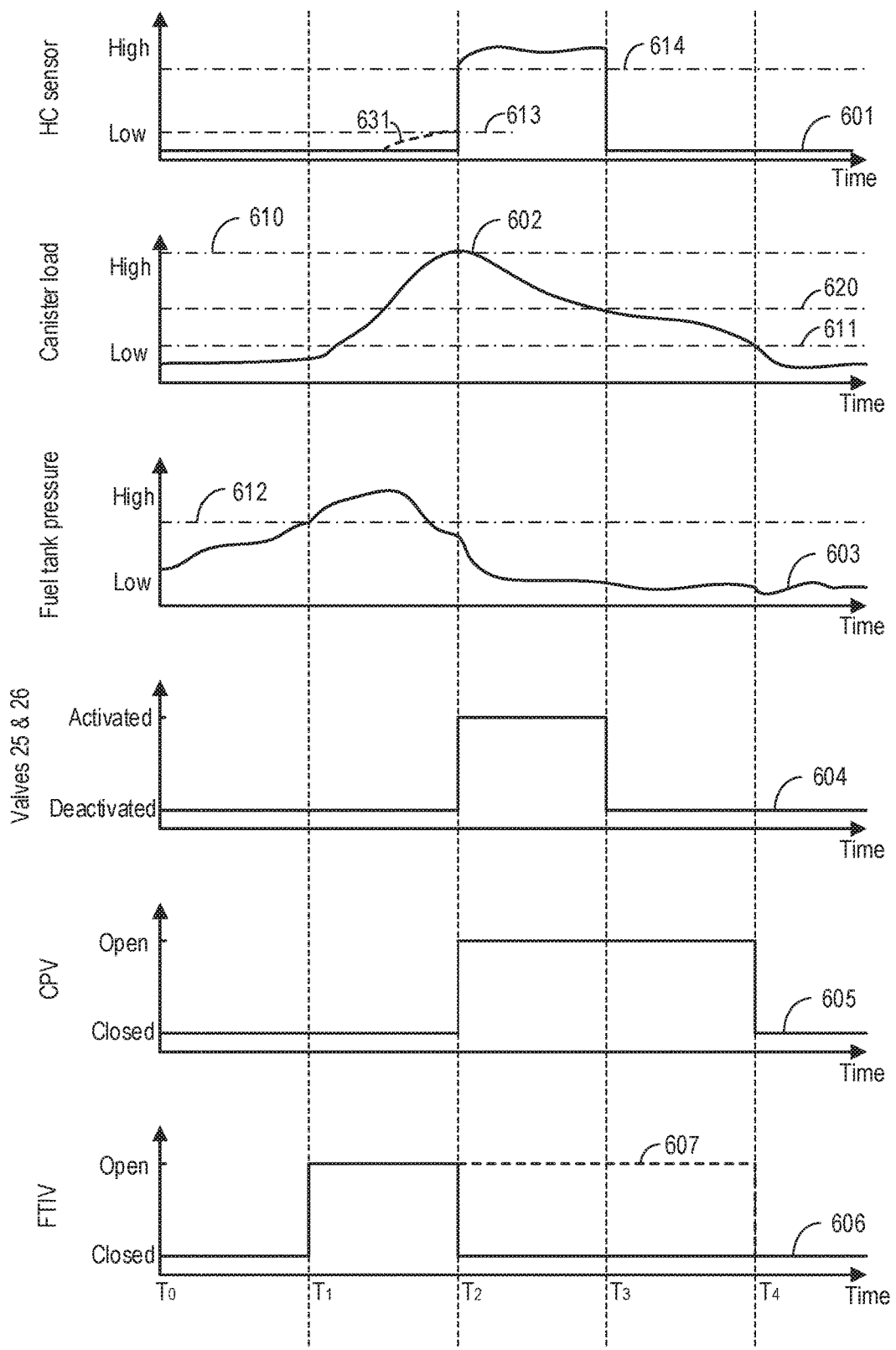
FIG. 6 is a timeline illustrating various operating parameters of the engine while performing the example method.

The following description relates to systems and methods for detecting degradation of a HC sensor in an evaporative emission control (EVAP) system of a vehicle, such as a hybrid vehicle system depicted in FIG. 1. The vehicle may include an engine and a fuel system coupled to the EVAP system, as shown in FIG. 2. Within the EVAP system, the HC sensor may be used to monitoring HC breakthrough from a fuel vapor canister to the atmosphere during canister loading. The EVAP system may further include a first valve coupled to a purge port and a second valve coupled to a vent port of the fuel vapor canister. The fuel vapor canister maybe purged by setting the EVAP system in different configurations. As an example, in a first configuration as shown in FIG. 3, the first and second valves may be activated during canister purging so that air may enter the fuel vapor canister from the purge port and exit from the vent port. Desorbed HCs exiting the vent port may then be routed to the engine. While the valves are activated, the HC sensor rationality check may be performed based on the HC reading of the desorbed HCs exiting the vent port. In another example configuration shown in FIG. 4, the first and second valves may be deactivated during canister purging so that air may enter the fuel vapor canister from the vent port and exit from the purge port. The desorbed HCs are then routed to the engine bypassing the HC sensor. An example method of performing HC sensor rationality check is shown in FIG. 5. FIG. 6 shows timelines of operating parameters while implementing the method shown in FIG. 5.

FIG. 1 illustrates an example vehicle propulsion system 100. Vehicle propulsion system 100 includes a fuel burning engine 10 and a motor 120. As a non-limiting example, engine 10 comprises an internal combustion engine and motor 120 comprises an electric motor. Motor 120 may be configured to utilize or consume a different energy source than engine 10. For example, engine 10 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 10 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 10 is deactivated.

During other operating conditions, engine 10 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 10 may be operated by combusting fuel received from fuel system 140 as indicated by arrow 142. For example, engine 10 may be operated to propel the vehicle via drive wheel 130 as indicated by arrow 112 while motor 120 is deactivated. During other operating conditions, both engine 10 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 10 may propel the vehicle via a second set of drive wheels.

In other embodiments, vehicle propulsion system 100 may be configured as a series type vehicle propulsion system, whereby the engine does not directly propel the drive wheels. Rather, engine 10 may be operated to power motor 120, which may in turn propel the vehicle via drive wheel 130 as indicated by arrow 122. For example, during select operating conditions, engine 10 may drive generator 160, which may in turn supply electrical energy to one or more of motor 120 as indicated by arrow 114 or energy storage device 150 as indicated by arrow 162. As another example, engine 10 may be operated to drive motor 120 which may in turn provide a generator function to convert the engine output to electrical energy, where the electrical energy may be stored at energy storage device 150 for later use by the motor.

Fuel system 140 may include one or more fuel storage tanks 44 for storing fuel on-board the vehicle. For example, fuel tank 44 may store one or more liquid fuels, including but not limited to: gasoline, diesel, and alcohol fuels. In some examples, the fuel may be stored on-board the vehicle as a blend of two or more different fuels. For example, fuel tank 44 may be configured to store a blend of gasoline and ethanol (e.g., E10, E85, etc.) or a blend of gasoline and methanol (e.g., M10, M85, etc.), whereby these fuels or fuel blends may be delivered to engine 10 as indicated by arrow 142. Still other suitable fuels or fuel blends may be supplied to engine 10, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 14 may communicate with one or more of engine 10, motor 120, fuel system 140, energy storage device 150, and generator 160. As will be described by the process flow of FIG. 5, control system 14 may receive sensory feedback information from one or more of engine 10, motor 120, fuel system 140, energy storage device 150, and generator 160. Further, control system 14 may send control signals to one or more of engine 10, motor 120, fuel system 140, energy storage device 150, and generator 160 responsive to this sensory feedback. Control system 14 may receive an indication of an operator requested output of the vehicle propulsion system from a vehicle operator 102. For example, control system 14 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 14 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 10.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 44 may be configured to store the fuel received from fuel dispensing device 170 until it is supplied to engine 10 for combustion. In some embodiments, control system 14 may receive an indication of the level of fuel stored at fuel tank 44 via a fuel level sensor. The level of fuel stored at fuel tank 44 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 14. In one example, the control system may adjust engine output and/or the wheel brakes to increase vehicle stability in response to sensor(s) 199.

FIG. 2 shows a schematic depiction of vehicle system 206. The vehicle system includes engine 10 coupled to a fuel system and an EVAP system. In some examples, vehicle system may be a hybrid electric vehicle system.

The fuel system may include a fuel tank 44 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It will be appreciated that fuel system may be a return-less fuel system, a return fuel system, or various other types of fuel system. Fuel tank 44 may hold a plurality of fuel blends, including fuel with a range of alcohol concentrations, such as various gasoline-ethanol blends, including E10, E85, gasoline, etc., and combinations thereof. Fuel may be pumped into the fuel tank from fuel dispensing device via a refueling line 48.

Vapors generated in the fuel system may be routed to the EVAP system which includes a fuel vapor canister 22 via vapor recovery line 31. Vapor recovery line 31 may be coupled to fuel tank 44 via a fuel tank isolation valve (FTIV) 116. As an example, FTIV 116 may be positioned between the fuel tank and the canister within vapor recovery line 31. FTIV 116 may be a normally closed valve, that when opened, allows for the venting of fuel vapors from fuel tank 44 to canister 22. Fuel vapors may then be vented to the atmosphere, or purged to an engine intake manifold 43. Canister purge valve (CPV) 15 is directly coupled to the engine intake manifold 43. Under default conditions, CPV 15 may be closed such that fuel vapors may be vented to the atmosphere.

Pressure sensor 35 may be coupled to vapor recovery line 31 for monitoring pressure within fuel tank 44. Fuel vapor canister 22 may include three ports: load port 33 mechanically coupled to the fuel tank 44 via FTIV 116, purge port 34 mechanically coupled to valve 25 via passage 28, and vent port 32 mechanically coupled to valve 26 via passage 27. Valves 25 and 26 may be multi-position valves. As an example, valves 25 and 26 may be three-way valves. As another example, valve 25 may be a three-way valve and valve 26 may be a three-way stop valve. By activating and deactivating valves 25 and 26, the EVAP system may purge canister 22 in two different configurations. When valves 25 and 26 are in a default, deactivated state (shown in FIGS. 2 and 4), the purge port 34 is in direct fluid connection with CPV 15, and the vent port 32 is in direct fluid connection with the canister vent valve (CVV) 17. When the valves 25 and 26 are in a second, activated state, the purge port 34 is in direct fluid connection with CVV 17, and the purge port 32 is in direction fluid connection with CPV 15.

Canister 22 may include a buffer 22a (or buffer region), each of the canister and the buffer comprising adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal).

Vehicle system may further include control system 14. Control system 14 may include a controller 12 receiving information from a plurality of sensors 16 (various examples of which are described herein) and sending control signals to a plurality of actuators 81 (various examples of which are described herein) based on the received signals and instructions stored on a memory of the controller. The fuel system and EVAP system may be operated by controller 12 in a plurality of modes by selective adjustment of the various valves and solenoids. For example, the vehicle system may be operated in a fuel vapor canister loading mode (e.g., during a fuel tank refueling operation and with the engine not running) or fuel vapor canister purging mode by operating various valves.

FIG. 2 shows the canister in the loading mode. During canister loading mode, FTIV 116 may be opened and the CPV 15 may be closed. Valves 25 and 26 may be in their default positions. The vent port 32 may be in direct fluid communication with the atmosphere by opening CVV 17. As shown by the arrows, fuel vapors evaporated from the fuel tank may enter buffer 22a through load port 33 and first be adsorbed within the buffer. Then, when the buffer is saturated, fuel tank vapors may be further adsorbed in the canister. Fuel vapors without HCs may exit canister 22 through vent port 32 and be vented to the atmosphere through CVV 17. HC sensor 36 may be positioned in the flow of fuel vapors exiting canister 22 for monitoring HC breakthrough from the canister.

FIG. 3 shows an example configuration of the vehicle system during canister purging mode. In response to a canister purging request, controller may open CPV 15 and close FTIV 116. Controller may further activate valves 25 and 26 to a second position. Fresh air is drawn by the vacuum in the engine manifold 43 into the EVAP system. The flow of fresh air may be regulated by CVV 17. Fresh air first flows to valve 25 through passage 119, then enters canister 22 via the purge port 34. HCs stored in canister 22 are desorbed and exit canister via the vent port 32. The desorbed HCs are then routed to manifold 43 of engine 10 through valve 26. HC sensor 33 may sense the HC content in the flow path of the desorbed HCs. Since the desorbed HCs having a relatively high concentration of HC content, sensor degradation may be detected if HC sensor reading is lower than a non-zero threshold.

Figure 4:
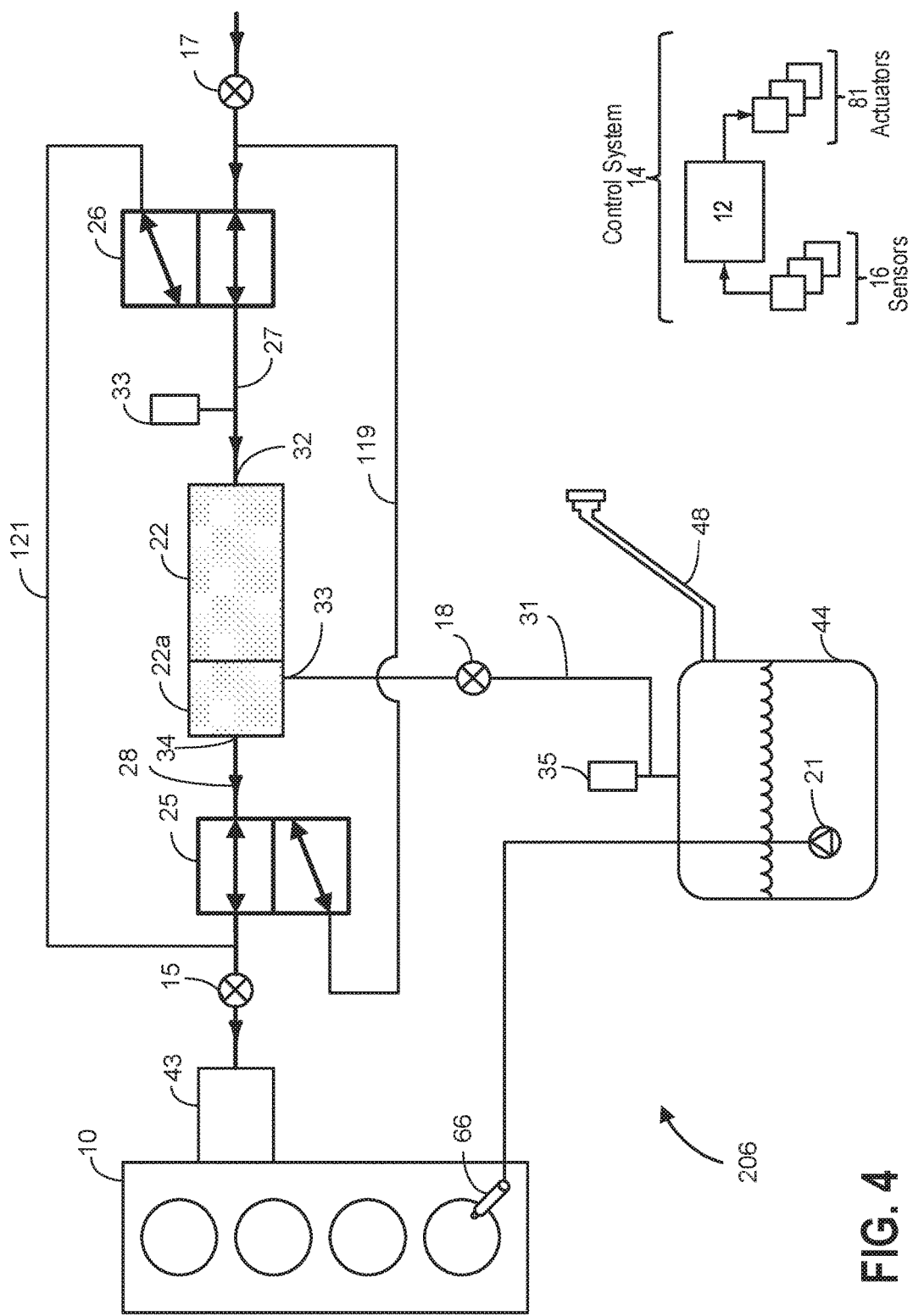
FIG. 4 shows another example system configuration for purging the fuel vapor canister.

FIG. 4 shows another example configuration of the vehicle system during canister purging mode. In this configuration, CPV 15 is opened and FTIV is closed. Different from the configuration shown in FIG. 3, herein, valves 25 and 26 are deactivated to the default position. Fresh air is drawn first to valve 26 via opened CVV 17, and then enters canister 22 through the vent port 32. Desorbed HCs exit canister 22 through purge port 31, and then are drawn into manifold 43 through valve 25. As such, the canister is purged by flowing air from the vent port to the purge port, in a reversed direction of the purge air flow in FIG. 3.

FIGS. 2-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As another example, elements positioned apart from each other with only a space there-between and no other components may be referred to as such, in at least one example.

FIG. 5 is an example method 500 for performing rationality check of a HC sensor in a vehicle system such as vehicle system 206. When a fuel vapor canister is fully loaded with HCs, the vehicle system may perform a two-stage purging of the canister. During the first stage, HC sensor rationality check is performed while desorbed HCs from the canister are routed through the HC sensor before reaching an engine of the vehicle system. When the rationality check is completed, during the second stage, desorbed HCs are routed to the engine bypassing the HC sensor.

Instructions for carrying out method 500 and the rest of the methods included herein may be executed by a controller based on instructions stored on a memory of the controller and in conjunction with signals received from sensors of the engine system, such as the sensors described above with reference to FIGS. 1-4. The controller may employ engine actuators of the engine system to adjust engine operation, according to the methods described below.

At step 501, vehicle operating conditions are estimated by a controller. The controller (e.g., controller 12 in FIG. 2) acquires measurements from various sensors in the engine system and estimates operating conditions such as engine load, engine speed, and the load of the fuel vapor canister. The load of the fuel vapor canister may be estimated for example by a HC sensor coupled between the FTIV and the fuel vapor canister. The controller may further detect states of the valves and measure fuel tank pressure with a pressure sensor such as sensor 35 in FIG. 2.

At step 502, the controller determines if the fuel tank need to be vented. As an example, the controller may determine to vent the fuel tank if the measured fuel tank pressure from step 501 is higher than a predetermined non-zero threshold pressure. As another example, the controller may determine to vent the fuel tank during vehicle refueling. If the controller determines not to vent the fuel tank, method 500 moves on to step 504, wherein the fuel tank may be isolated from the EVAP system by closing the FTIV. Otherwise, method 500 moves on to step 503, wherein controller opens FTIV and closes CPV so that the fuel vapor canister enters the loading mode. As shown in FIG. 2, during the loading mode, fuel vapors are vented through the canister to atmosphere. Further, HCs in the fuel vapors are adsorbed and stored in the canister.

At step 517, the HC sensor coupled between the vent port of the canister and the atmosphere (e.g., sensor 33 in FIG. 2) monitors HC content in the vented fuel vapors to the atmosphere. If the HC content is higher than a threshold amount, method 500 moves on to step 518 to indicate HC breakthrough from the canister and set corresponding diagnostic code. The controller may further increase the duration of future canister purging at step 518.

At step 505, the controller determines whether the fuel vapor canister needs to be purged. For example, the controller may indicate or request canister purging based on the load of the fuel vapor canister from step 501, for example as a function of the loading. As one example, increased loading may trigger a request for canister purging, for example based on whether the load is above a threshold. As another example, the controller may determine a need to purge the canister after a predetermined duration from last canister purging. The controller may further determine the necessity of canister purging in response to a refueling event. Further still, the controller may determine the necessity of canister purging based on ambient temperature. For example, the request for canister purging may be a function of the ambient temperature, with increased ambient temperature translating via a mathematical function to more often requesting purging. As another example, a look-up table may be used where ambient temperature is the input and a modifier to reduce a time between purges is the output.

At step 519, the controller may determine if canister purging can be initiated under current operating conditions. For example, canister purging may be initiated when the engine is operating. If controller determines to start canister purging, method 500 moves to step 507. Otherwise, method 500 continues monitoring operating conditions at step 520.

At step 507, the controller determines if HC sensor rationality check should be performed. As an example, the controller may determine performing HC sensor rationality check based on (as a mathematical function of), in one example, the duration from last rationality check. As another example, the controller may determine performing HC sensor rationality check based on (e.g., as a mathematical function of) vehicle operating conditions. If controller determines not to perform sensor rationality check, method 500 moves to step 508. Otherwise, method 500 moves to step 509.

At step 508, the controller may deactivate valves 25 and 26 to the default position and open CPV to allow vacuum in the engine manifold to draw fresh air through the canister (as shown in FIG. 4). Fresh air flows through valve 26 and HC sensor before reaching the vent port of the fuel vapor canister. Purge flow in the canister directs from the vent port (e.g., port 32 in FIG. 4) to the purge port (e.g. port 34 in FIG. 4). The desorbed HCs flow from the vent port into the engine manifold through valve 25 and CPV.

At step 509, the controller may activate valves 25 and 26 to the second position and open CPV to run HC sensor rationality check during canister purging (as shown in FIG. 3). Fresh air enters the canister through the purge port and exits through the vent port. The controller may determine HC sensor degradation based on the measurement of HC loading of the desorbed HCs exiting the vent port. For example, the controller may determine HC sensor degradation as a function of the measurement of HC loading of the desorbed HCs exiting the vent port, for example by comparing the measurement to a threshold or a threshold that varies as a function of temperature.

As one example, at step 510, the measured HC loading may be compared to a non-zero threshold. As another example, the non-zero threshold may be determined as a function of a load of the fuel vapor canister, with the threshold increasing with increasing loading, or from a look-up table with loading as the input and the threshold as the output, the look-up table calibrated with values based on example operation and/or testing. As another example, the non-zero threshold may be determined based on the operating conditions of the engine. If the HC loading is lower than the non-zero threshold, sensor degradation may be determined. Consequently, the controller may indicate sensor degradation at step 512 by setting a corresponding diagnostic code. The controller may further indicate sensor degradation to vehicle driver at step 512. If the measured HC loading in the desorbed gas is higher than the non-zero threshold, the controller may clear corresponding diagnostic code. The controller may further store the time that the rationality check is performed in the memory for future reference.

At step 513, after finishing HC sensor rationality check, the controller deactivates valves 25 and 26 to the default state, and finishing purging of the canister by flowing fresh air from the vent port to the purge port of the canister (as shown in FIG. 4). For example, the controller may deactivate valves 25 and 26 after a time period. The time period may be determined based on (e.g., as a mathematical function of) operating conditions, canister load, and/or the geometry of the canister to ensure that the canister is sufficiently purged. As another example, the controller may deactivate valves 25 and 26 based on canister load.

At step 514, method 500 determines if canister purge is completed. As an example, canister purging may be considered completed if an estimated load of the canister is lower than a threshold. As another example, canister purging may be considered completed after purging for a predetermined time period. If canister purging has not been completed, method 500 maintains valve position at step 515. Otherwise, if canister purge has been completed, method 500 moves on to step 516 wherein the controller may close CPV and FTIV.

FIG. 6 illustrates relevant operating parameters over time while implementing method 500. The operating parameters include HC sensor reading 601, canister load 602, fuel tank pressure 603, state of valves 25 & 26 604, state of CPV 605, and state of FTIV 606. The x-axes indicate time and are increased from left to right.

From $T_0$ to $T_1$, as fuel tank pressure 603 is lower than a non-zero threshold pressure 612, CPV and FTIV are closed so that the fuel vapor canister is isolated from the engine and the fuel tank.

At time $T_1$, in response to fuel tank pressure 603 higher than threshold pressure 612, FTIV is opened so that fuel vapor may be vented through the fuel vapor canister to the atmosphere, as shown in FIG. 2. As such, fuel vapor canister enters a loading mode. As fuel vapor flowing through the canister, canister load 602 increases from $T_1$ to $T_2$. HC sensor (e.g., sensor 33 in FIG. 2) monitors HC breakthrough from the fuel vapor canister. HC breakthrough may be determined by an HC sensor reading (e.g., 631) higher than a non-zero threshold 613.

At time $T_2$, in response to fuel vapor canister load 611 higher than a non-zero threshold 610, the controller indicates canister purging. Alternatively, the controller may indicate canister purging responsive to HC breakthrough 631. If operating conditions are suitable for canister purging, the controller opens CPV so that the vacuum in the engine manifold may draw purge flow through the canister.

The first stage of canister purging may start from time $T_2$ by activating valves 25 and 26 so that purge flow in the canister is in a direction from the purge port to the vent port, as shown in FIG. 3. As an example, the FTIV may be closed to isolate the fuel tank from the EVAP system. As another example, the FTIV may be opened during canister purging, so that fuel vapor from the fuel tank may be drawn to the engine intake manifold. As stored HCs being desorbed from the canister, canister load 602 continues decreasing from $T_2$ to $T_3$. HC sensor reading 601 is increased during the same time period. If HC sensor reading is higher than a non-zero threshold 614, the controller may determine that no degradation is detected. Otherwise, if the HC sensor reading is lower than the non-zero threshold 614, the controller may indicate sensor degradation.

At time $T_3$, the controller deactivates valves 25 and 26 to start a second stage of canister purging (as shown in FIG. 4), wherein purge flow in the canister is in a reversed direction comparing to the first stage. The second stage of canister purging may be started for example when sensor rationality check is completed. As another example, the second stage of canister purging may be started when the canister load is lower than a second threshold 620. From $T_3$ to $T_4$, canister load 602 keeps falling as desorbed HCs are drawn into the engine manifold. During the second stage of canister purging, HC sensor reading 601 is low as only fresh air flows through the sensor.

At time $T_4$, in response to canister load lower than a third threshold 611, the controller may close CPV and FTIV to finish the canister purging process. The controller may alternatively end canister purging after a predetermined period.

In this way, rationality check may be regularly performed on a HC sensor that is used to detect vehicle bleed emission. The technical effect of positioning a HC sensor between the vent port of the canister and the atmosphere is that HC breakthrough from the canister may be detected. Technical effect of flowing desorbed HC from fuel vapor canister through the HC sensor during purging is that degradation of the HC sensor may be detected with minimal influence on normal vehicle operation. Technical effect of reversing purge flow in the canister during canister purging is that HCs stored in the canister may be completely purged. Further, the duration of canister purging may be reduced.

A method for an engine includes A method for an engine comprising: sensing fuel vapor vented from a fuel vapor canister to atmosphere via a sensor; and during purging of the fuel vapor canister, actuating valves to flow desorbed hydrocarbons from the fuel vapor canister to the engine, sensing desorbed hydrocarbons with the sensor positioned in the flow path of the desorbed hydrocarbons, and determining sensor degradation based on the sensed desorbed hydrocarbons. In a first example of the method, sensor degradation is determined if the sensed desorbed hydrocarbons are lower than a non-zero threshold. A second example of the method optionally includes the first example and further includes flowing desorbed hydrocarbons to the engine bypassing the sensor during purging of the fuel vapor canister. A third example of the method optionally includes one or more of the first and second examples, and further includes the sensor is bypassed after determining sensor degradation. A fourth example of the method optionally includes one or more of the first through third examples, and further includes, the valves are actuated by activating two valves, and each valve in direct fluid communication with the fuel vapor canister. A fifth example of the method optionally includes one or more of the first through fourth examples, and further includes, the valves are two three way valves. A sixth example of the method optionally includes one or more of the first through fifth examples, and further includes, the purging of the fuel vapor canister is performed in response to an estimated load of the fuel vapor canister higher than a threshold. A seventh example of the method optionally includes one or more of the first through sixth examples, and further includes, the purging of the fuel vapor canister is performed in response to an engine start after refueling.

A method for an engine, comprising: in a first condition, flowing air to a vent port of the fuel vapor canister, and then flowing the desorbed hydrocarbons from a purge port of the fuel vapor canister to an intake manifold of the engine; in a second condition, reversing direction of air flow through the fuel vapor canister, the air entering the fuel vapor canister through the purge port and exiting the fuel vapor canister at the vent port, detecting hydrocarbon load by a hydrocarbon sensor positioned in flow path of the air with desorbed hydrocarbons exiting the fuel vapor canister through the vent port, and determining sensor degradation based on the detected hydrocarbon load. In a first example of the method, in the second condition, the desorbed hydrocarbons are further routed from the vent port to the intake manifold of the engine. A second example of the method optionally includes the first example and further includes the direction of the air flow through the fuel vapor canister is reversed by activating a first valve directly coupled to the vent port and a second valve directly coupled to the purge port. A third example of the method optionally includes one or more of the first and second examples, and further includes the hydrocarbon sensor is mechanically coupled between the vent port of the fuel vapor canister and the first valve. A fourth example of the method optionally includes one or more of the first through third examples, and further includes, in the second condition, the vent port of the fuel vapor canister is in direct fluid communication to the engine, and the purge port of the fuel vapor canister is in direct fluid communication to the atmosphere. A fifth example of the method optionally includes one or more of the first through fourth examples, and further includes, indicating sensor degradation if the detected hydrocarbon load is lower than a non-zero threshold. A sixth example of the method optionally includes one or more of the first through fifth examples, and further includes, the threshold is determined based on a load of the fuel vapor canister. A seventh example of the method optionally includes one or more of the first through sixth examples, and further includes, the threshold is determined based on the operating conditions of the engine. An eighth example of the method optionally includes one or more of the first through seventh examples, and further includes, the second condition comprises completion of a refueling event.

An evaporative emission control system for an engine, comprising: a fuel tank, a fuel vapor canister coupled to the fuel tank, a first and second valves, a hydrocarbon sensor coupled between the fuel vapor canister and the first valve, a controller configured with computer readable instructions stored on non-transitory memory for: venting fuel vapor from the fuel vapor canister to atmosphere via the first valve, and sensing the vented fuel vapor with the hydrocarbon sensor; in response to a request of sensor rationality check, flowing fresh air from a second valve to the fuel vapor canister and then from the fuel vapor canister to an intake manifold of the engine via the first valve, and performing a rationality check of the hydrocarbon sensor; and in response to completion of the rationality check, flowing fresh air from the first valve to the fuel vapor canister and then from the fuel vapor canister to the intake manifold via the second valve. In a first example of the method, the controller is configured for monitoring canister breakthrough based on the sensed vented fuel vapor. A second example of the method optionally includes the first example and further includes the controller is configured for flowing fresh air from the first valve to the fuel vapor canister and then from the fuel vapor canister to the intake manifold via the second valve further in response to an estimated load of the fuel vapor canister lower than a non-zero threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine comprising:
sensing fuel vapor vented from a fuel vapor canister to atmosphere via a sensor; and
during purging of the fuel vapor canister,
actuating valves to flow desorbed hydrocarbons from the fuel vapor canister to the engine,
sensing desorbed hydrocarbons with the sensor positioned in the flow path of the desorbed hydrocarbons, and
determining sensor degradation based on the sensed desorbed hydrocarbons.

2. The method of claim 1, wherein sensor degradation is determined if the sensed desorbed hydrocarbons are lower than a non-zero threshold.

3. The method of claim 1, further comprising flowing desorbed hydrocarbons to the engine bypassing the sensor during purging of the fuel vapor canister.

4. The method of claim 3, wherein the sensor is bypassed after determining sensor degradation.

5. The method of claim 1, wherein the valves are actuated by activating two valves, each valve in direct fluid communication with the fuel vapor canister.

6. The method of claim 5, wherein the valves are two three way valves.

7. The method of claim 1, wherein the purging of the fuel vapor canister is performed in response to an estimated load of the fuel vapor canister higher than a threshold.

8. The method of claim 1, wherein the purging of the fuel vapor canister is performed in response to an engine start after refueling.

9. A method for an engine, comprising:
in a first condition, flowing air to a vent port of a fuel vapor canister, and then flowing desorbed hydrocarbons from a purge port of the fuel vapor canister to an intake manifold of the engine;
in a second condition, reversing direction of air flow through the fuel vapor canister, the air entering the fuel vapor canister through the purge port and exiting the fuel vapor canister at the vent port,
detecting hydrocarbon load by a hydrocarbon sensor positioned in flow path of the air with desorbed hydrocarbons exiting the fuel vapor canister through the vent port, and
determining sensor degradation based on the detected hydrocarbon load.

10. The method of claim 9, wherein in the second condition, the desorbed hydrocarbons are further routed from the vent port to the intake manifold of the engine.

11. The method of claim 9, wherein the direction of the air flow through the fuel vapor canister is reversed by activating a first valve directly coupled to the vent port and a second valve directly coupled to the purge port.

12. The method of claim 9, wherein the hydrocarbon sensor is mechanically coupled between the vent port of the fuel vapor canister and the first valve.

13. The method of claim 9, wherein in the second condition, the vent port of the fuel vapor canister is in direct fluid communication with the engine, and the purge port of the fuel vapor canister is in direct fluid communication with the atmosphere.

14. The method of claim 9, further comprising indicating sensor degradation if the detected hydrocarbon load is lower than a non-zero threshold.

15. The method of claim 14, wherein the threshold is determined based on a load of the fuel vapor canister.

16. The method of claim 14, wherein the threshold is determined based on operating conditions of the engine.

17. The method of claim 9, wherein the second condition comprises completion of a refueling event.

18. An evaporative emission control system for an engine, comprising:
a fuel tank,
a fuel vapor canister coupled to the fuel tank,
a first valve and a second valve,
a hydrocarbon sensor coupled between the fuel vapor canister and the first valve,
a controller configured with computer readable instructions stored on non-transitory memory for:
venting fuel vapor from the fuel vapor canister to atmosphere via the first valve, and sensing the vented fuel vapor with the hydrocarbon sensor;
in response to a request of sensor rationality check, flowing fresh air from the second valve to the fuel vapor canister and then from the fuel vapor canister to an intake manifold of the engine via the first valve, and performing a rationality check of the hydrocarbon sensor; and
in response to completion of the rationality check, flowing fresh air from the first valve to the fuel vapor canister and then from the fuel vapor canister to the intake manifold via the second valve.

19. The system of claim 17, wherein the controller is configured for monitoring canister breakthrough based on the sensed vented fuel vapor.

20. The system of claim 17, wherein the controller is configured for flowing fresh air from the first valve to the fuel vapor canister and then from the fuel vapor canister to the intake manifold via the second valve further in response to an estimated load of the fuel vapor canister lower than a non-zero threshold.

* * * * *